United States Patent [19]
Honda

[11] Patent Number: 5,519,680
[45] Date of Patent: May 21, 1996

[54] DISC RECORDING AND REPRODUCING DEVICE FOR IMPROVED RECORDING OF TABLE OF CONTENTS INFORMATION

[75] Inventor: Kazuhiko Honda, Hamamatsu, Japan

[73] Assignee: Yamaha Corporation, Japan

[21] Appl. No.: 130,264

[22] Filed: Oct. 1, 1993

[30] Foreign Application Priority Data

Oct. 5, 1992  [JP]  Japan ................................. 4-290768

[51] Int. Cl.[6] .................................................. G11B 5/09
[52] U.S. Cl. .................................. 369/47; 369/54
[58] Field of Search ............................. 369/58, 59, 47, 369/48, 50, 32, 124

[56] References Cited

U.S. PATENT DOCUMENTS

5,124,963  6/1992  Ando ............................ 369/54

*Primary Examiner*—Georgia Y. Epps
*Assistant Examiner*—P. W. Huber
*Attorney, Agent, or Firm*—Graham & James

[57] ABSTRACT

A disc recording and reproducing device includes a recording start switch for starting recording on a disc in which a table-of-contents area is provided in addition to a recording area in which main information is recorded, an optical pick-up and a magnetic head for performing intermittent recording on the disc, a recording stop switch for stopping recording on the disc, a music head designation key and a music interval detection circiut for generating a pause signal indicating a pause in the main information during the recording on the disc, and a circuit including a system controller for detecting the pause signal and writing a stop address of main information recorded immediately before arrival of the pause signal and a start address of next main information to be recorded in the table-of-contents area during waiting time of the intermittent recording. A trouble occurring due to stoppage of supply of an electric power during continuous recording of plural music pieces on the disc in real time can be minimized.

4 Claims, 7 Drawing Sheets

FIG. 6

DISC RECORDING AND REPRODUCING DEVICE FOR IMPROVED RECORDING OF TABLE OF CONTENTS INFORMATION

BACKGROUND OF THE INVENTION

This invention relates to a disc recording and reproducing device capable of minimizing a trouble occurring in writing in a TOC (table-of-contents) area due to stoppage of supply of an electric power or other cause during continuous recording of information.

Since a Compact Disc (CD) was developed as a superior recording medium to an analog record, some other new recording media have been developed. A Mini Disc (MD) is one of these newly developed recording media. The Mini Disc is attracting attention of the industry as a prospective audio recording medium which has portability of the Compact Cassette and also operability and tone quality of the Compact Disc.

Since the MD has adopted a new audio compression system while employing the PCM system similar to the CD, the MD can realize a high tone quality which is about the same as the CD with the amount of information which is about one fifth of the CD. For this reason, reproduction time which is about the same as the CD can be realized with a disc having a diameter which is about half that of the CD.

There are two types of MD. A reproduction only MD is made of an optical disc similar to the CD. In the case of an MD which is capable of both recording and reproduction MD is made of a magneto-optical disc. An MD player adapted to these two types of MDs has not only an optical head for recording and reproduction but also a magnetic head for writing.

In a digital disc such as the CD, a TOC (table-of-contents) area is generally provided before a recording area so as to enable a prompt search of a head of a music piece during playback or a prompt search of an empty area for additional recording. A start time (start address) of each music piece and an end time of the disc, etc. are recorded in the TOC area in the form of a table.

For recording plural music pieces continuously in a disc having the TOC area, the following three methods can generally be conceived:

(1) A first method is one according to which all music editing operations are completed by using another medium such as a magnetic tape, TOC information is prepared from the result of the editing operation and recorded in the disc, and the edited music information is continuously dubbed from the tape to the disc.

(2) A second method is one according to which recording is made continuously on a disc in real time and, thereafter, TOC information is prepared from the result of recording and recorded in a TOC area of the disc. According to this method, it is necessary to input music head information by operation of a music head indicating key by a user during recording or to detect the music head information automatically during recording and input it.

(3) A third method is one according to which, as a modification of the second method, TOC information is successively produced during recording of music information on a disc and this TOC information is stored in a non-volatile solid memory and, after completion of recording of all music pieces, the TOC information is read from the memory and written in the disc.

The above described first method cannot enable recording to be made in real time and, moreover, requires a recording medium other than the disc. Hence, the advantage of a disc recording and reproducing device of an MD type disc is not gained from this method and therefore this method is not suitable for a home use.

In the second method, when supply of an electric power is stopped due to stoppage of electricity or accidental pulling off of a power plug by the user or some other cause during recording, the recording is stopped without writing the TOC information and, accordingly, not only a music piece-recording of which has been interrupted but all other music pieces which have so far been recorded cannot be reproduced so that recording must be made from the beginning again. Even if the music pieces can be reproduced, the TOC information is still lacking and, hence, a high speed search utilizing the TOC information will have to be abandoned or the TOC editing will have to be made again.

The third method can solve the problem of the second method but it requires a very expensive non-volatile memory for this purpose with resulting increase in the manufacturing cost.

It is, therefore, an object of the invention to provide a disc recording and reproducing device which, in a case where plural music pieces are continuously recorded in real time on a disc, is capable of minimizing the trouble occurring in writing of data in the TOC area due to stoppage of supply of an electric power.

SUMMARY OF THE INVENTION

For achieving the above described object of the invention, a disc recording and reproducing device for recording and reproducing data on and from a disc in which a table-of-contents area is provided in addition to a recording area in which main information is recorded comprises recording means for continuously recording main information including plural pause information each indicating a pause in the main information in the recording area, and recording control means for writing the pause information in the table-of-contents area of the disc each time the pause information arrives.

In one aspect of the invention, a disc recording and reproducing device comprises a recording start switch for starting recording on a disc in which a table-of-contents area is provided in addition to a recording area in which main information is recorded, means for performing intermittent recording on the disc, a recording stop switch for stopping recording on the disc, means for generating a pause signal indicating a pause in the main information during the recording on the disc, and means for detecting the pause signal and writing a stop address of main information recorded in immediately before arrival of the pause signal and a start address of next main information to be recorded in the table-of-contents area during waiting time of the intermittent recording.

According to the invention, when stoppage of an electric power has taken place during continuous recording of plural main information (e.g., music pieces) which are divided from one another, the pause information for the main information which have so far been recorded is preserved and, therefore, a trouble accompanying such stoppage of supply of an electric power can be minimized.

Moreover, according to the invention, neither other recording medium such as a magnetic tape nor a non-volatile memory is necessary and, therefore, the pause information can be written easily and in an inexpensive manner.

Preferred embodiments of the invention will be described below with reference to the accompanying drawings.

BRIEF DESCRIPTION OF THE DRAWINGS

In the accompanying drawings.

DESCRIPTION OF PREFERRED EMBODIMENTS

Figure 7:
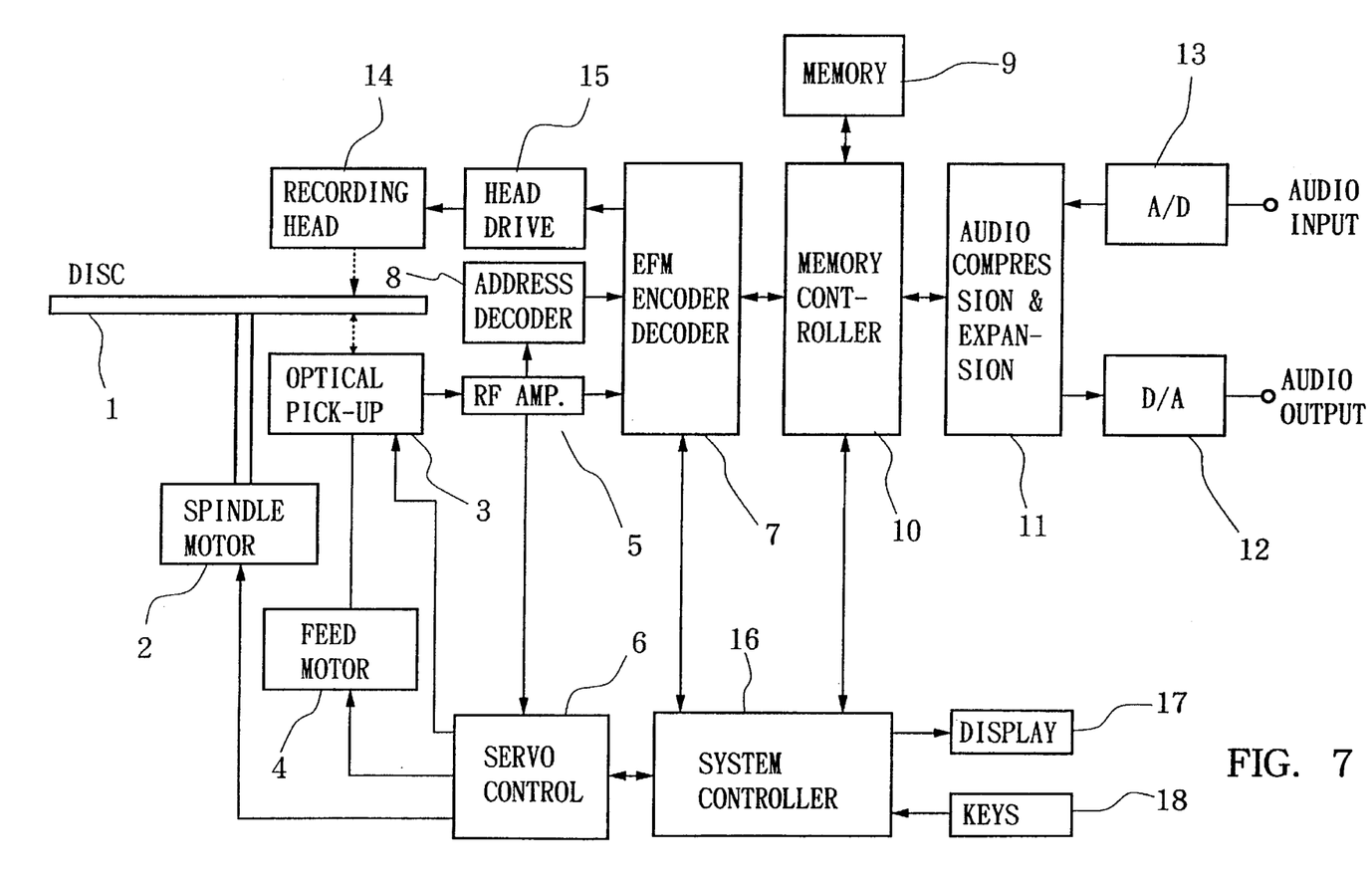
FIG. 7 is a block diagram showing an example of a basic MD recording and reproducing device.

FIG. 7 shows a basic MD type disc recording and reproducing device. In FIG. 7, reference character 1 designates a disc, 2 a spindle motor for rotating this disc 1 at a constant linear velocity, 3 an optical pick-up for optically reading information from the disc 1 or magneto-optically writing information on the disc 1, 4 a feed motor for moving this pick-up 3 in the radial direction of the disc 1, 5 a high frequency (RF) amplifier for amplifying the output of the pick-up 3 and 6 a servo control section for performing a rotation control for the spindle motor 2, a feed control for the feed motor 4 and a focus tracking control for the pickup 3.

The disc 1 is either a reproduction only MD which is capable of reproduction only or a recording and reproduction MD which is capable of not only reproduction but also recording. The optical pick-up 3 has, as to the reproduction only MD, a function of reading information from the reproduction only MD using an optical disc by detecting the magnitude of reflected laser beam and, as to the recording and reproduction MD, a function of reading information from the recording and reproduction MD using a magneto-optical disc by detecting the difference in a Kerr effect and a function of writing information on the recording and reproduction MD in a magneto-optical manner.

A reading system of this MD player includes a decoder section of an encoder/decoder 7 for decoding the output of the amplifier 5, an address decoder 8 for detecting an address being reproduced from the output of the amplifier 5, a memory 9 for temporarily storing the decoder output of the encoder/decoder 7, a controller 10 for the memory 9, an expansion section of an audio compression/expansion circuit 11 for expanding the output of the memory 9, and a digital-to-analog converter 12 for converting the expansion output of the compresson/expansion circuit 11 to an analog signal.

The encoder/decoder 7 adopts EFM (eight to fourteen modulation) as its modulation system and CIRC (cross interleave Reed-Solomon code) as its error correction system.

A writing system of this MD player includes an analog-to-digital conversion section 13 for converting an analog signal to a digital signal, a compression section of the audio compression/expansion circuit 11 for compressing the converted digital signal for removing an unnecessary component for reproduction of an audio signal from the digital signal, the memory 9 for temporarily storing compressed signal and the controller 10 for the memory 9, an encoder section of the decoder/encoder 7 for encoding the output of the memory 9, a recording head (magnetic head) 14 for writing the encoded signal on the disc 1, and a head drive circuit 15 for driving the recording head 14.

There are also provided a system controller 16 which controls the entire MD player, a display 17 which displays various information and operation keys 18 which imparts various instructions.

The above described MD player includes similar components of a Compact Disc player as its basic components and additionally includes other functions such as an audio compression/expansion function, a vibration-proof function and a user recording function.

The audio compression performed by the audio compression/expansion circuit 11 is made by thinning out unnecessary data by utilizing human hearing characteristics. In a compression technique called ATRAC (Adaptive Transform Acoustic Coding), about five-fold data compression can be realized by utilizing the minimum human hearing characteristics and the masking effect.

The expansion section which restores the compressed data regenerates a digital waveform successively by processing the decoded output of the encoder/decoder 7. By this system, a signal having an-equal quality to a signal having level changes of 16-bit stages and a sampling frequency of 44.1 kHz.

For performing this data compression and expansion, the buffer memory 9 having a corresponding capacity is required in the signal processing circuit.

One feature which improves portability of an MD player is a vibration-proof technique against "skipping of sound". This is realized in this embodiment by utilizing the difference between the reading rate of the pick-up 3 and the transfer rate of data input to the audio compression/expansion circuit 11 and utilizing the memory 9 as a data buffer. More specifically, the reading rate of the pick-up 3 is a high rate of 1.4 Mb (megabit)/sec. whereas the transfer speed of data input to the audio compression/expansion circuit 11 is a low rate of 0.3 Mb/sec. By using the memory 9 having the capacity of, e.g., 1M bit, data for about 3 seconds can be stored. Hence, even when reading from the disc 1 has stopped due to vibration, skipping of sound does not occur in a reproduced audio output if reading from the disc 1 is resumed within 3 seconds.

The memory 9 can be used also for writing. In this case, the compressed data provided from the audio compression/expansion circuit 11 at the rate of 0.3 Mb/sec. is stored temporarily in the memory 9 and then read from the memory 9 and transferred to the encoder/decoder 7 at the reading rate of 1.4 Mb/sec. Since writing on the disc 1 by the recording head 14 is made at 1.4 Mb/sec., this writing becomes intermittent writing using only a part of the total processing time.

The advantage of using the recording and reproduction MD as the disc 1 is that the disc 1 is writable. For writing information, the magnetic recording head 14 and laser beam of the optical pick-up 3 are used. As the writing system, there is used the magnetic field modulation system according to which a laser beam of a constant laser beam strength is irradiated on the lower surface of the disc 1 by the optical pick-up 3 and a magnetic field modulated by written data is applied from the upper surface of the disc 1 by the magnetic recording head 14.

An embodiment of the invention having the above described basic structure will be described below.

Figure 1:
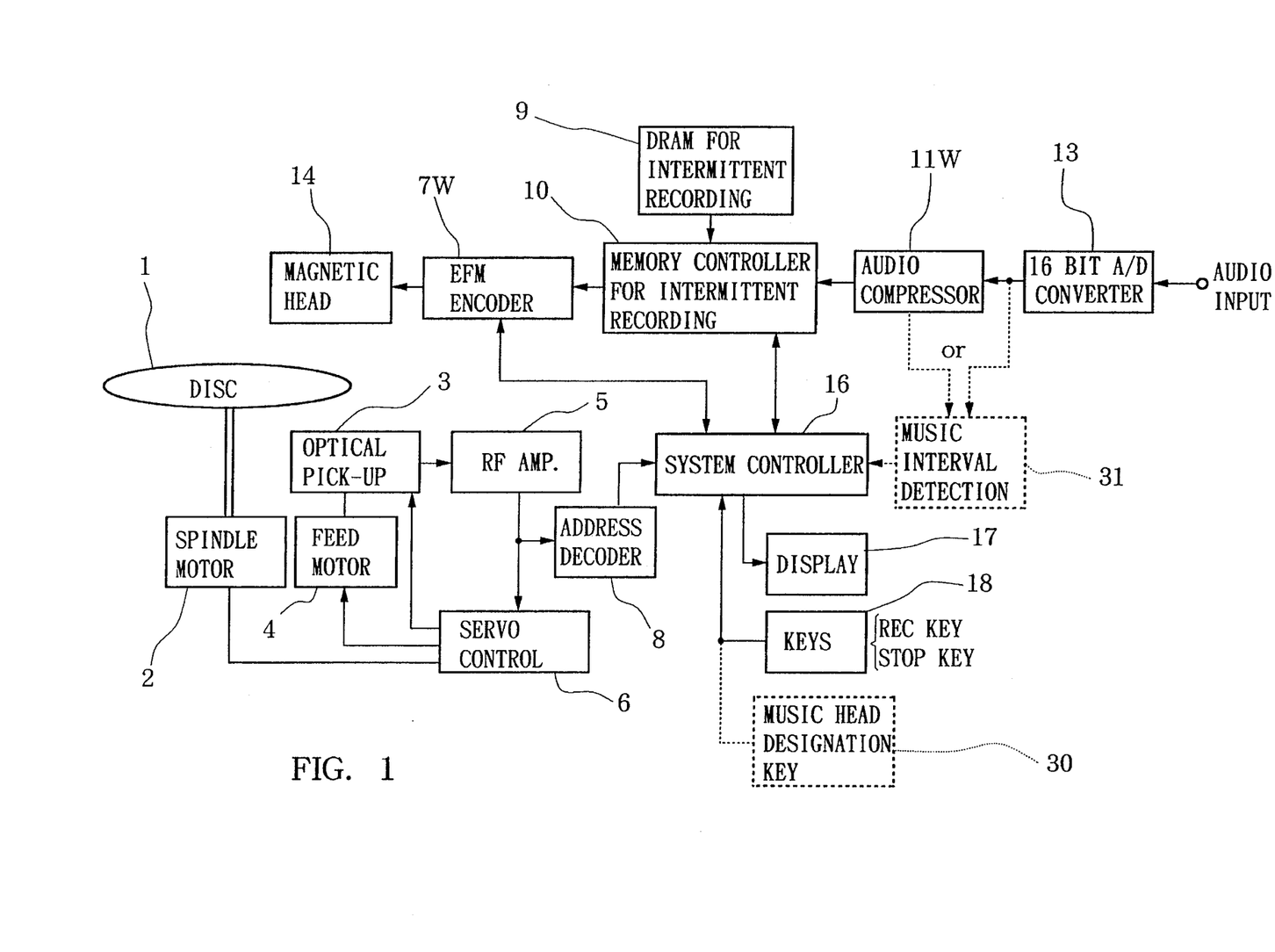
FIG. 1 is a block diagram showing an embodiment of the invention.

FIG. 1 shows an embodiment of the invention and shows the portion of the structure of FIG. 7 excluding the reading system. Namely, a compression section 11W only is shown with respect to the audio compression/expansion circuit and an encoder 7W only is shown with respect to the encoder/decoder. Further, the memory 9 is denoted as a DRAM for intermittent recording and the memory controller 10 is denoted as an intermittent recording memory controller. The other component parts which are the same as those in FIG. 7 are designated by the same reference characters as in FIG. 7 and description thereof will be omitted.

For carrying out this invention, in the embodiment of the invention shown in FIG. 1, a music head designation key 30 and a music interval detection circuit 31 are added. Keys 18 include a REC key designating start of recording and a STOP key designating end of recording. The music head designation key 30 is used when the user manually inputs music interval information during recording. The music interval detection circuit 31 performs inputting of music interval information automatically by detecting a music interval from the output of the analog-to-digital converter 13 or the output of the audio compressor 11W and thereupon automatically generates the music interval information.

Figure 2:
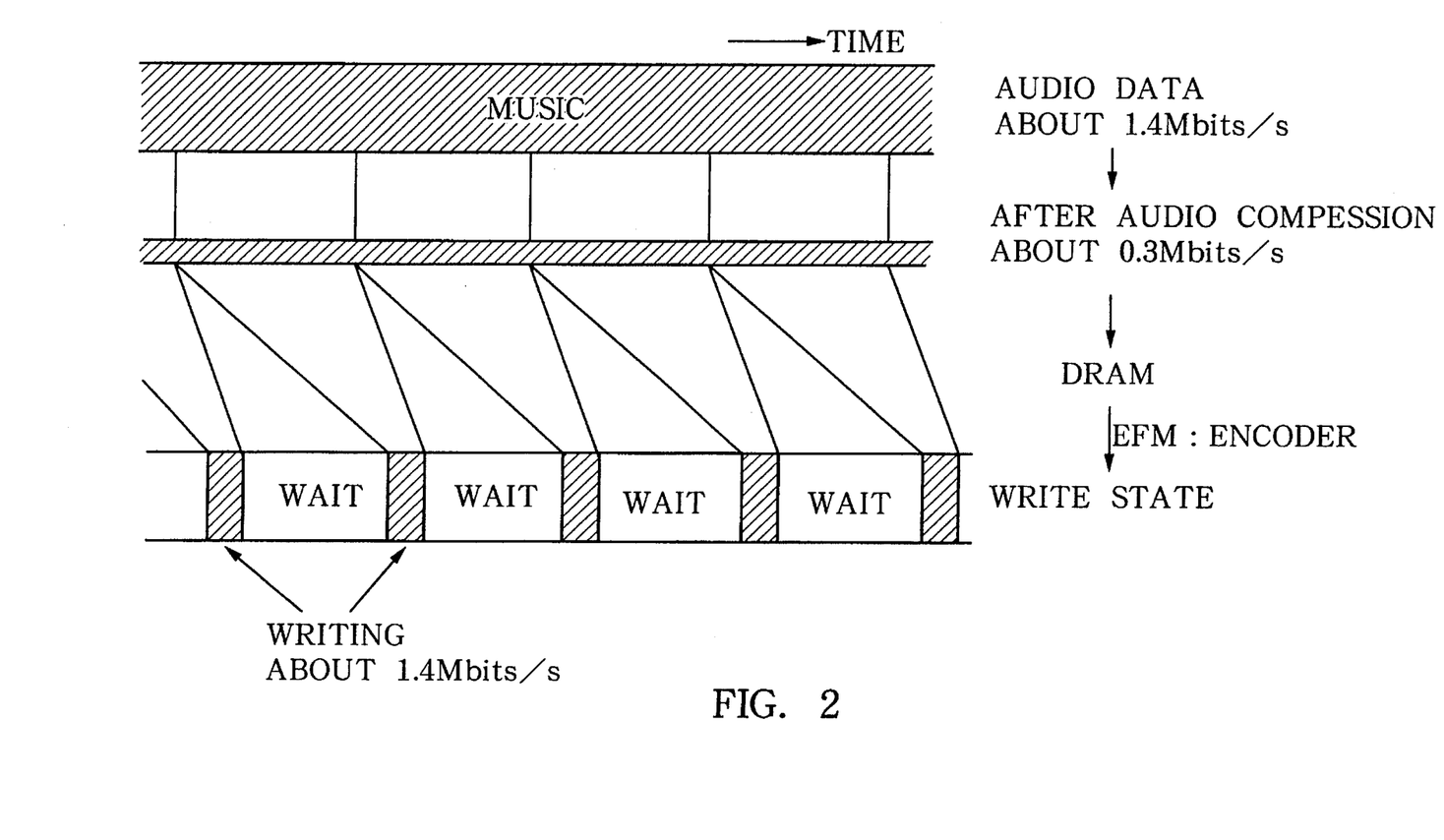
FIG. 2 is a graph for explaining intermittent writing in an MD.

FIG. 2 shows the intermittent writing. In this graph, the horizontal axis indicates the time base and the vertical axis indicates the flow of processing. The uppermost stage shows audio data of the transfer rate of 1.4 Mb/sec. which has been converted to digital data by the analog-to-digital converter 13. By compressing this data by the audio compressor 11W, the data becomes compressed data of the transfer rate of 0.3 Mb/sec. shown in the middle stage. This compressed data is supplied through the DRAM 9 and the EFM encoder 7W to the magnetic head 14 (illustration of the head drive circuit is omitted) and is written on the disc 1 at a rate of 1.4 Mb/sec as audio data recording rate. Therefore, there is waiting time which is longer than single writing time between respective writing operations.

In a case where the magnetic field modulation system is employed for writing, only a portion of the disc 1 on which laser beam is irradiated by the optical pick-up 3 is magnetized by the magnetic field inversion operation of the magnetic head 14 whereby information in the form of "1" or "0" is written. The recording density in this case is determined by the performance of the optical pick-up 3. In the case of the same optical constants as the Compact Disc, the above described writing transfer rate becomes 1.4 Mb/sec. the same as the audio data recording rate.

The amount of writing and waiting time during one cycle are determined by the system design and the waiting time is always provided whatever system design is adopted. The invention utilizes this waiting time for writing TOC information.

The operation of the above described embodiment will be described with reference to the graphs of FIGS. 3 to 5 and the flow chart of FIG. 6.

Figure 3:
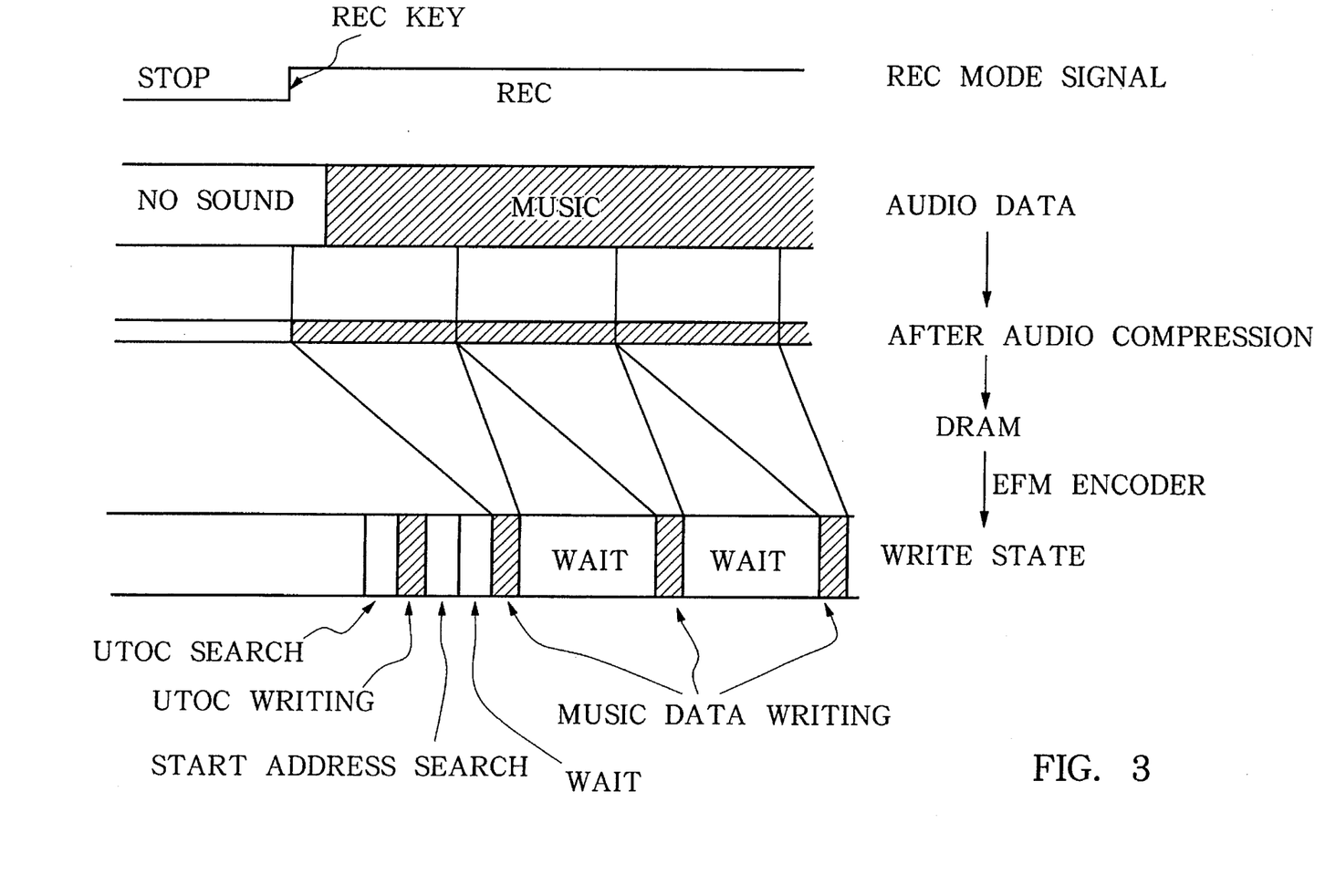
FIG. 3 is a graph for explaining an operation of the embodiment at the start of recording.
Figure 6:
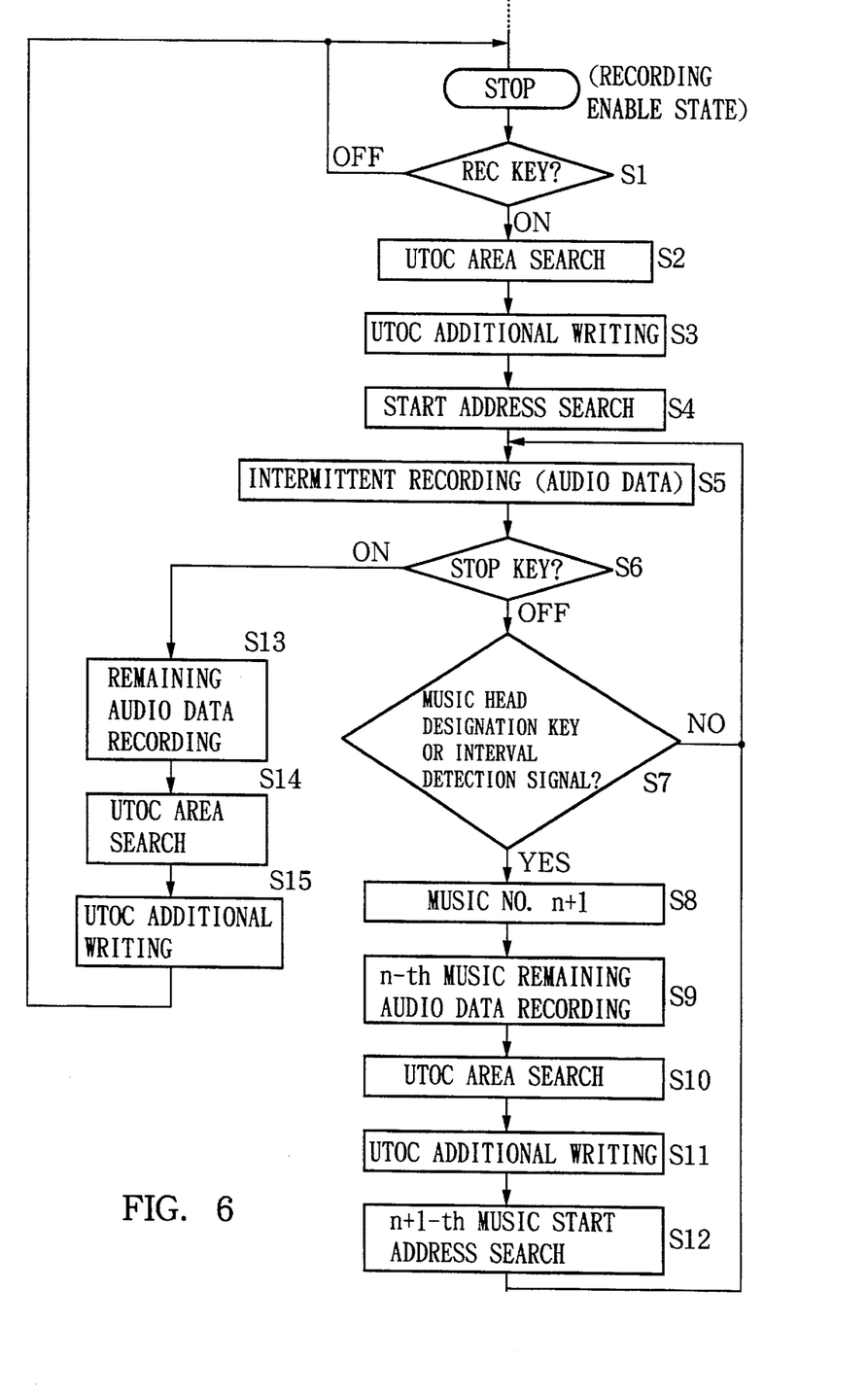
FIG. 6 is a flow chart showing processing of a system controller.

Referring first to FIGS. 3 and 6, the operation at the start of recording will be described. It is now assumed that the system is in a standby mode (a mode in which recording is possible) before starting recording after inserting the disc 1 in the system. The system controller 16 monitors the state of the REC key (step S1 in FIG. 6) and, upon turning on of the REC key, searches a UTOC area (step S2) (The UTOC is the abbreviation of User TOC which is prepared by the MD system). Upon completion of the search for the UTOC area, a start address at which recording is to be started anew is additionally written in the disc 1 in step S3. During this operation, the analog-to-digital conversion and audio compression operations are continued and the compressed data is accumulated in the DRAM 9. Therefore, "skipping of sound" does not occur. Then, in step S4, search for the start address at which recording is to be started is made and, in step S5, the data accumulated in the DRAM is written intermittently as was described with reference to FIG. 2.

Figure 4:
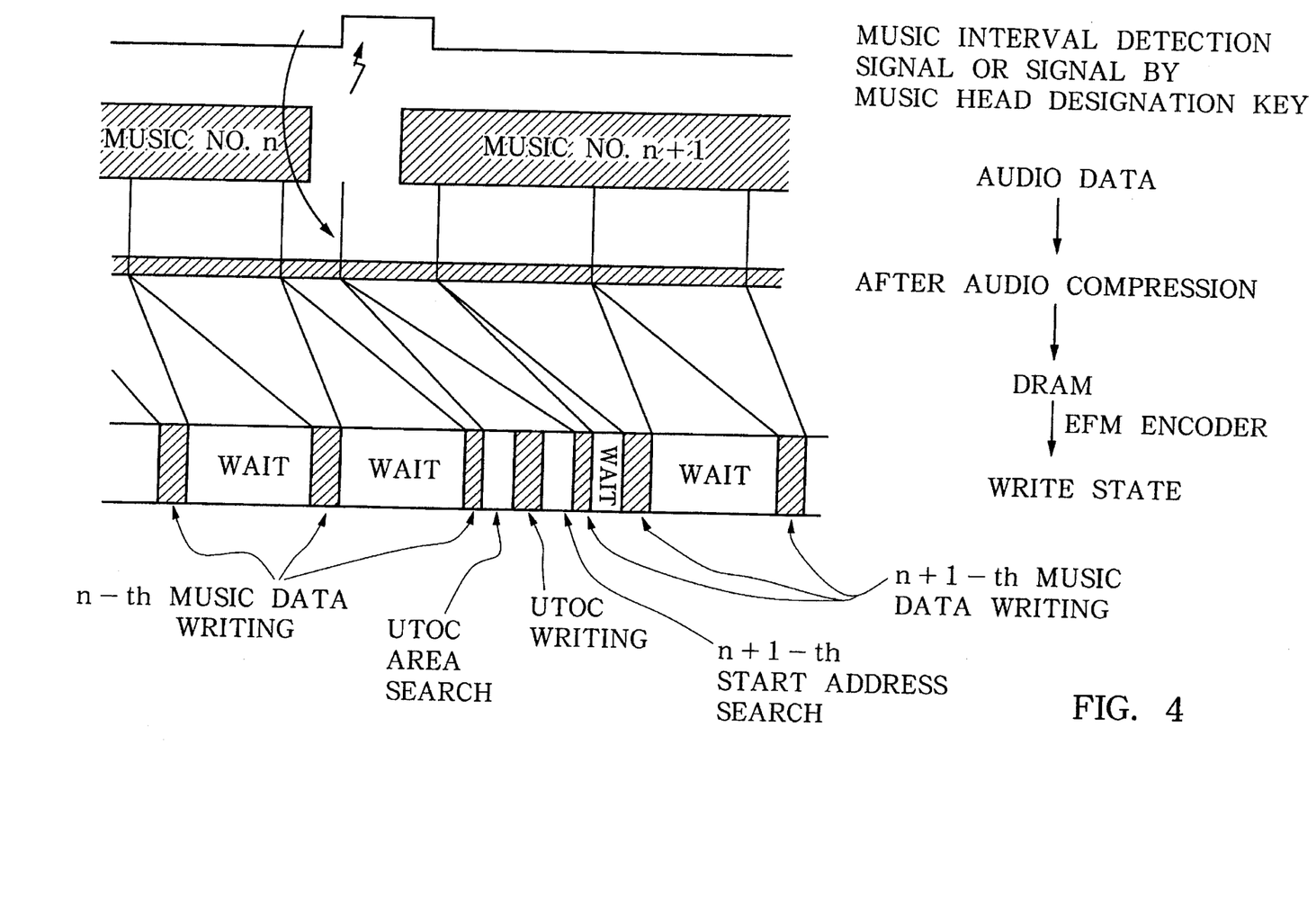
FIG. 4 is a graph for explaining an operation of the embodiment during detection of a music interval.
Figure 5:
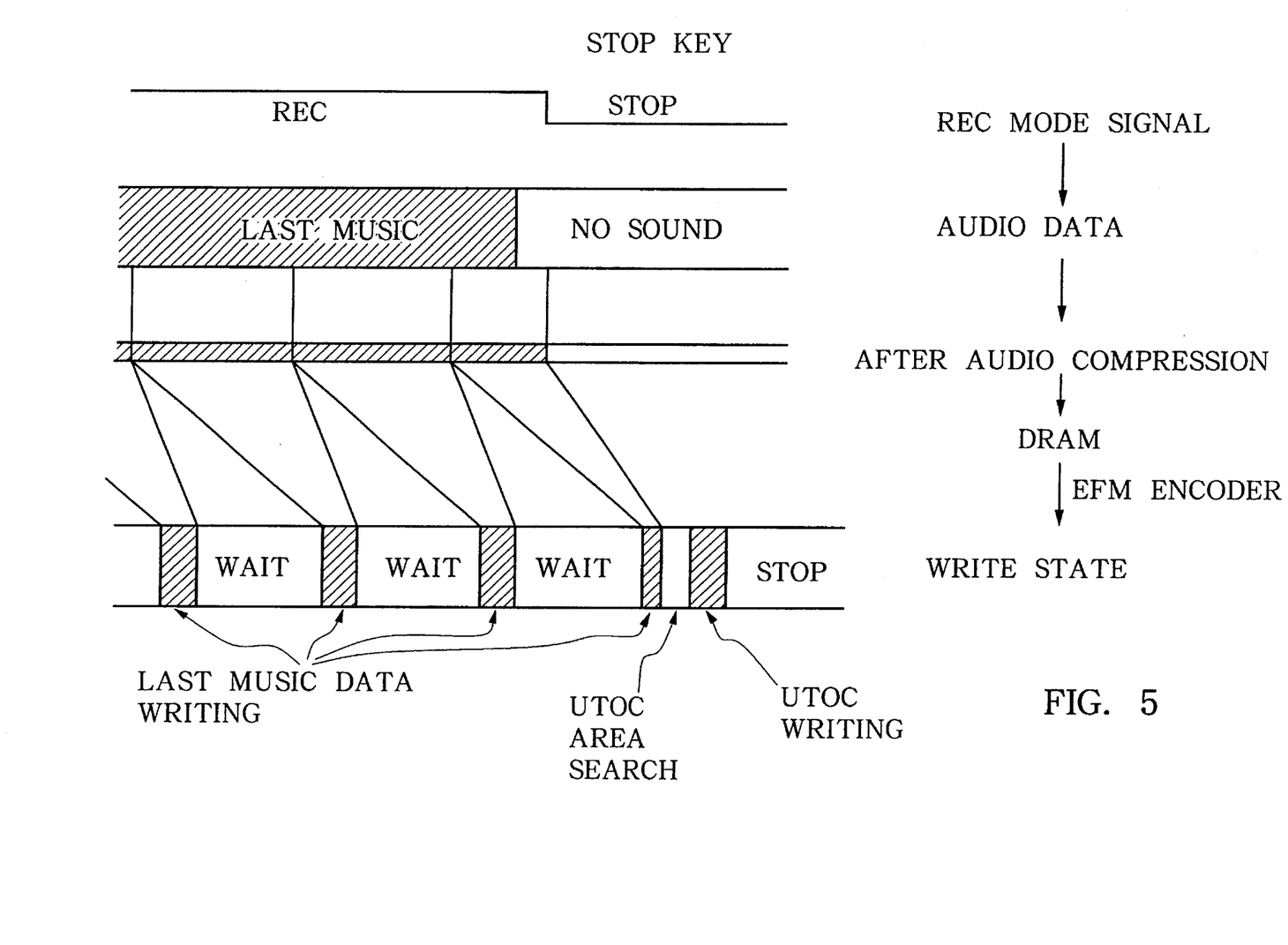
FIG. 5 is a graph for explaining an operation of the embodiment at the end of recording.

Referring now to FIGS. 4 and 6, writing of pause information will be described. In step S6 in FIG. 6, the state of the STOP key is detected and, when an OFF state of the STOP key is detected, whether or not the music head designation key 30 has been turned on or the music interval detection signal has been detected is judged in step S7. If the result is NO, the routine returns to step 85 to continue the intermittent recording. If the result is YES, the routine advances to step S8 in which the music number progresses by one (1). Then, in step S9, the remaining audio data of the n-th music piece is recorded and, in next step S10, search for the UTOC area is made. In next step S11 which is the music interval period, a stop address of the area so far recorded and a start address of a next music piece are additionally written in the UTOC area. During this period, the analog-to-digital conversion and audio compression are continued and the compressed data is accumulated in the DRAM 9. After search for the start address of the next music piece is made in next step S12, the routine returns to step S5 for performing the intermittent recording.

Finally, referring to FIGS. 5 and 6, the operation at the end of recording will be described. Upon detection of the ON state of the STOP key in step S6 in FIG. 6, the routine goes to step S13 in which the remaining audio data accumulated in the DRAM 9 is recorded. Then, search for the UTOC area is made in step S14 and, in next step S15, the stop address of the last music piece is additionally written in the UTOC area whereby all processing is completed.

Thus, by recording the start address and stop address of each music piece in the TOC area each time the music piece is recorded, when supply of an electric power is accidentally stopped during continuous recording of plural music pieces in real time, all UTOC information is preserved for music pieces which have so far been recorded except for the music piece recording of which has been interrupted and, therefore, a trouble occurring due to the stoppage of supply of an electric power can be minimized.

What is claimed is:

1. A disc recording and reproducing device for recording and reproducing data on and from a disc in which a table of contents is provided in addition to a recording area in which main information is recorded comprising:

recording means for intermittently recording main information including plural pause information which indicates a pause in the main information in the recording area, said main information being intermittently recorded during a first and second period of time, a wait period being disposed therebetween; and recording control means for writing, during said wait period, the pause information in the table of contents area of the disc each time the pause information occurs.

2. A disc recording and reproducing device comprising:

a recording start switch for starting recording on a disc in which a table of contents area is provided in addition to a recording area in which main information is recorded;

means for performing intermittent recording on the disc during a first and second time period, a wait period being disposed therebetween;

a recording stop switch for stopping recording on the disc;

means for generating a pause signal indicating a pause in the main information during the recording on the disc; and means for detecting the pause signal and writing a stop address of main information recorded immediately before arrival of the pause signal and a start address of the next main information to be recorded in the table of contents area during the wait period of the intermittent recording.

3. A disc recording and reproducing device according to claim 2 further comprising:

means for writing a start address at which recording starts when said recording start switch is activated in the table-of-contents area.

4. A disc recording and reproducing device according to claim 2 further comprising:

means for writing an end address of the last music piece when said recording stop switch is activated.

* * * * *